Aug. 7, 1956  R. E. CRYOR  2,758,043
UNIT HEAT INSULATION FOR PIPES
Filed Sept. 14, 1953  2 Sheets—Sheet 1

INVENTOR.
Robert E. Cryor
BY
Robert W. Wendt
Attorney

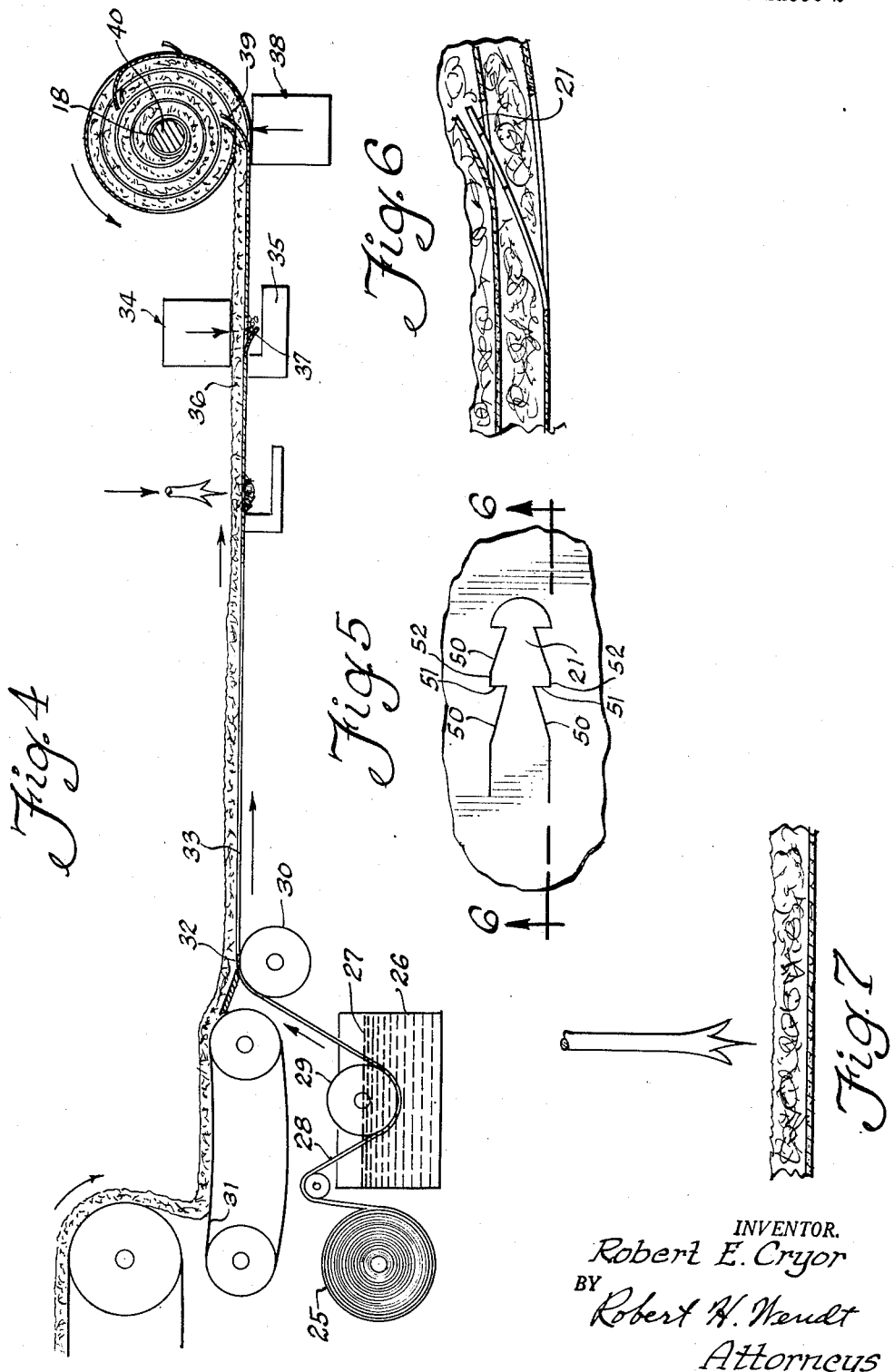

United States Patent Office 2,758,043
Patented Aug. 7, 1956

2,758,043
UNIT HEAT INSULATION FOR PIPES

Robert E. Cryor, Hinsdale, Ill.

Application September 14, 1953, Serial No. 379,906

1 Claim. (Cl. 154—44)

The present invention relates to unit heat insulation for pipes or the like, and is particularly concerned with the provision of substantially cylindrical heat insulating units of predetermined length, separable into two halves, to be applied to pipes of predetermined sizes, about which the heat insulating units fit, the two halves being secured together.

One of the objects of the invention is the provision of an improved form of heat insulation, having sufficiently rigid characteristics, so that it maintains its shape and assembly, but utilizing only a minimum amount of rigid insulation framework and a maximum amount of soft insulating fibers in the form of loose sheets, which have the maximum insulating value.

Another object of the invention is the provision of an improved insulating product having a substantially rigid framework of heat insulating material, such as asbestos paper, the parts of which are separated and further insulated to a maximum degree by sheets of loose insulating fibers in a condition to give a maximum heat insulating value, the heat insulating fibers being confined and held in proper position by insulating asbestos paper, which forms the framework and covering.

Another object of the invention is the provision of an improved substantially rigid heat insulating product for pipes or the like, which is durable and adapted to withstand breakage in transit or use, which is resilient, and adapted to adjust itself to pipe size, and which has a high insulating value.

Another object of the invention is the provision of an improved form of insulation for pipes or the like, which is light in weight, simple in structure, and laminated in a rigid, substantially cylindrical form with a heat insulating covering containing insulating fibers in their original resilient bulk state, without impregnation or any substantial compacting.

Another object of the invention is the provision of an improved method of making heat insulating unit coverings for pipe or the like, which product is adapted to withstand high temperatures, and which may be provided with any of a plurality of different forms of insulating wool or fiber, having a framework and covering, with spaces for the cavities, which do not unduly compress the fiber nor compact it, so that the loose fibers may form the major part of the insulation, and so that they may be maintained in their original resilient, fluffy state.

Other objects and advantages of the invention will be apparent from the following description and the accompanying drawings, in which similar characters of reference indicate similar parts throughout the several views.

Referring to the drawings, of which there are four sheets,

Fig. 1 is a view in perspective of a heat insulating unit embodying the invention, applied to a steam pipe or the like;

Fig. 4 is a diagrammatic side elevational view of one form of apparatus which may be used in carrying out my method of making such heat insulating units;

Fig. 5 is a fragmentary plan view of a portion of the asbestos paper, showing the preferred shape of the tabs punched;

Fig. 6 is a fragmentary sectional view, taken on the plane of the line 6—6 of Fig. 5, looking in the direction of the arrows; and Fig. 7 is a diagrammatic side elevational view of a barbed needle that may be employed to punch through the layers to bind them together.

Figure 1:
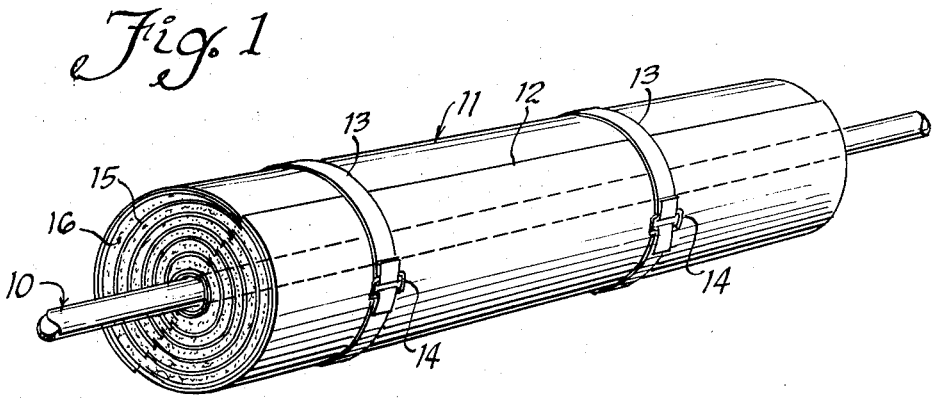
Figure 2:
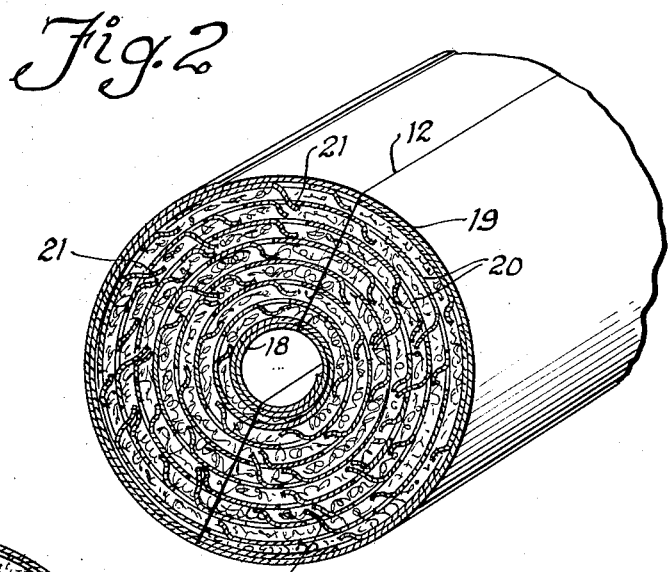
Fig. 2 is a fragmentary view in perspective of the end and side of such a heat insulating unit, showing the details of its construction.

Referring to Fig. 1, 10 indicates a steam pipe or the like which is to be insulated, and which is covered with a heat insulating unit 11 embodying the invention and separable along the line 12 into two diametrically opposite and equal halves for separation and application to the pipe.

The two halves are bound together on the pipe by a pasted canvas jacket and wire or by means of thin sheet metal strips 13, which extend about the heat insulating unit 11 and are drawn tightly through the closed metal loops 14 and bent backward at their ends to provide clamping bands.

The disclosure in Fig. 1 is too small to show all of the details of the heat insulating unit, which preferably consists of a plurality of spiral turns 15 of asbestos paper of sufficient width, corresponding to the length of the unit 11, the spiral turns being spaced from each other to provide spaces 16, which are filled with a continuous sheet of insulating fibers in loose, fluffy condition, substantially as the fibers come from the carding machine.

Various kinds of heat insulating paper or wrapping material 15 may be employed; but asbestos paper is preferred because of its resistance both to heat and combustion, and because while flexible in the forming operation, asbestos paper can be set into rigid form in the final assembly through application of suitable bonding or stiffening material.

Among the fibers which may be employed are mineral wool, such as may be made from limestone, slag wool made from furnace slag, glass fiber, or loose asbestos fibers in a resilient, bulky condition, such as Amosite asbestos. These resilient fibers may, if desired, be lightly bonded in the form of a sheet by a light spray of bonding material, such as a silicate of soda solution, potassium silicate solution, or a synthetic organic resin in liquid form.

In the preferred form the fibers are without any bonding material, which tends to impregnate and compact the fibers, at least slightly, and to diminish the heat insulating value.

The spiral space 16 between the spiral wrappings of asbestos paper is filled with the sheet of resilient insulating fibers.

The spiral sheet of asbestos paper is preferably impregnated by spraying, or by immersing, with the solution of sodium silicate or any of the other bonding materials mentioned, before it is wrapped, so that when it is set in a rigid condition, the spiral wrappings will constitute a rigid spiral framework between which the soft, resilient insulating fibers are confined in spiral sheet form.

In order to provide an inner wall for the heat insulating unit which is rigid and which completely covers all the loose insulating fibers on the inside of the unit, the first two turns 18 of the asbestos paper about the pipe are preferably made overlapping each other so as to form a tube inside the unit of rigid asbestos paper.

The last one or two turns of asbestos paper at 19 on the outside of the unit are wrapped upon each other, overlapping and adhering to each other by virtue of the impregnating bonding material which they contain. This forms an external rigid cylindrical covering for the unit.

All of the other spiral turns 20 of the unit also become rigid when the impregnating bonding material or solution becomes dried or set in a rigid condition.

In order to keep the spiral sheet of loose fibrous material in place in the spaces between the turns 20, which is particularly necessary after the finished unit is cut into two halves, the inner turns of asbestos paper and the fibers are preferably punched with tabs 21 of asbestos paper pressed inward between the loose fibers and through the next spiral turn, thus anchoring the inner spiral turns 20 together; but the external covering turns 19 and the internal tubular turns 17 are preferably maintained imperforate so that the fluffy fibrous filling will not be exposed either inside or outside.

The assembly of asbestos paper and fluffy fibers may also be subjected to a punching operation from the fluffy fiber side, causing the fluffy fibers to partially project through the asbestos paper by forming a hole and a tab, which tab projects into the next layer of fluffy fibers.

As an alternative to the punched tab, which is accomplished with suitably shaped, blunt punching pins, the punching may also be accomplished by the use of multiple hooked needles as commonly employed on so called needle punching looms.

Figure 3:
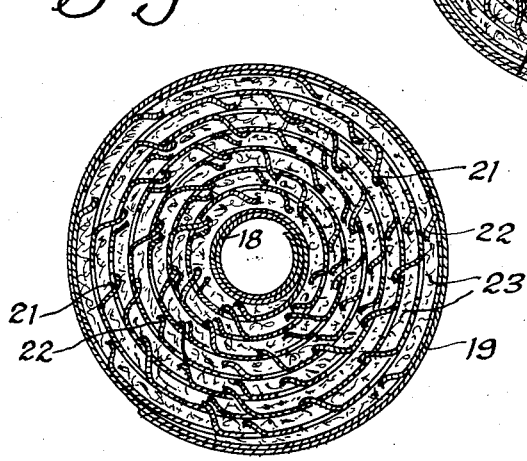
Fig. 3 is an end elevational view of one of the heat insulating units.

Referring to Fig. 3, both these types of punched formations 21 through the asbestos paper into the fibers and through the fibers into the asbestos paper are shown; and the latter is indicated at 22. The fluffy fiber filler is indicated at 23.

Referring to Fig. 4, this is a diagrammatic showing of one form of apparatus which may be used to practice my method of making such insulating units. My method includes the impregnating of asbestos paper of a predetermined width with a bonding agent, such as a solution of sodium silicate, potassium silicate, or liquid synthetic resin; but in some embodiments the solution may be sprayed on both sides of the sheet.

The impregnated asbestos sheet has its external surface in a tacky condition as a result of its progress from a roll 25 into a vat 26, having a predetermined amount of the impregnating solution, the free level being at 27.

The asbestos paper 28 dips into the solution by passing under roller 29 and emerges in the tacky condition over a roller 30.

The loose fibers in the form of glass fiber, Amosite asbestos fibers, mineral wool, or slag wool may be carried by a suitable conveyor 31 and deposited at 32 on the tacky asbestos paper 33, to which it adheres on one side, but is not impregnated.

Referring to Fig. 5, this is a fragmentary plan view of a portion of the asbestos sheet, showing a punched tab 21, which is provided with beveled portions 50 and abrupt shoulders 51, forming retaining teeth 52.

Referring to Fig. 6, this is a fragmentary sectional view, showing how the punched tab 21 may carry with it portions of the fibers and adhesive, pressing them into a hole formed in the next adjacent layer.

At 34 a punching machine, reacting against an anvil 35, punches tabs of the loose fibers 36 through a hole 37, which is made in the asbestos paper, anchoring the fibers to the paper. At the point 38 another suitable punching machine punches out tabs 39 of the asbestos paper and causes them to penetrate through the loose fibers into the next layer of asbestos paper, bonding the layers of asbestos paper together and anchoring the loose fibers in place at regularly spaced points.

Fig. 7 shows an alternative mode of binding the fibers of the layers together, by using multiple hooked needles as commonly employed on so-called needle punching looms. The hooks or barbs of such needles carry fiber down through paper, but permit the needles to be withdrawn, leaving fibers of different layers intertwined and bonded together.

Before starting to deposit the loose wool or fiber filler on the asbestos paper, one or more spiral turns 18 of asbestos paper are formed upon a mandrel 40 to provide the inner tubular core. Thereafter the loose fibers 36 and asbestos paper 33 are wrapped spirally on the mandrel 40, building up a spiral framework containing the loose asbestos or other fibers.

Finally, the flow of the loose fibers 36 is stopped; and the last few turns 19 of impregnated tacky asbestos paper are permitted to be wrapped spirally upon each other to adhere together and to form a substantially cylindrical external covering. After two turns of the paper on the outside, the paper may be cut off; and one pipe insulation unit is completed.

The unit, which is still wet from the bonding solution, is then permitted to dry out or is baked at a low drying temperature, or the liquid resin employed may be just permitted to set, if it has such characteristic, thus producing a rigid, cylindrical, tubular insulating member.

After setting or drying out, this tubular member is cut in two along the diametric line 12, which passes through the axis of the cylindrical body lengthwise and separates the body into two halves.

The two halves may be separated for application to the pipe 10 and may be secured about the pipe by means of the same bands 13 so that the pipe is insulated mainly by the loose spiral sheet of asbestos or other fluffy fibers.

Due to the resiliency of the fluffy fibers and to the fact that the edges of the asbestos paper at the diametric cut 12 may not quite register and may overlap each other, the unit is adapted to adjust itself to pipes of slightly different size, the overlapping asbestos sheet edges at the diametric cut 12 permitting the unit to be drawn to a smaller size.

It will thus be observed that I have invented heat insulating units for pipe or the like, which have a high insulating value because of the employment of sheets of loose, bulky insulating fibers, which sheets are maintained in their loose condition enclosed, confined and anchored between spiral wrappings of asbestos paper in a rigid condition.

Thus while retaining the loose uncompacted form of the fibrous insulating medium, to obtain the maximum in insulating value, I have at the same time assembled this loose, flexible fiber medium (normally incapable of practical application in the insulation of pipes) into a light weight, highly efficient, rigid pipe insulation suitable for easy application by conventional methods.

My insulating units are durable and adapted to withstand breakage in storage or transit. They are light in weight, may be manufactured economically; and they are simple in structure.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

Heat insulating and heat resistive pipe covering units comprising an inner rigid tubular member for receiving a pipe and forming an inner housing and an outer rigid tubular member forming an outer housing, said tubular members each comprising a plurality of engaging spiral turns of asbestos paper impregnated with silicate of soda solution, the spiral turns adhering together and being dried to a rigid condition, and a filler between said tubular members comprising a multiplicity of layers of asbestos paper integrally attached to the spiral turns in the tubular members, said filler layers of asbestos paper being impregnated with adhesive silicate of soda solution, and said filler layers being spaced from each other by a thick layer of loose, fluffy asbestos fibers, adhering at the tacky surfaces of the asbestos paper, but remaining loose, fluffy and highly insulating at all points away from said surfaces, the adhesive solution being dried to a rigid condition at said surfaces, and the rigid assembly being divided into two separable halves along a diametrically extending plane, with the rigid edges of the spiral turns located between the soft fluffy fibers at said plane by overlapping the edges of the spiral turns at said plane, the said edges extending into the loose fibers of the filler to form a cylindrical assembly of varying diameter for application to pipes of different sizes, the said loose, fluffy layer of asbestos being further anchored between the rigid spiral turns of the filler by fibers of fluffy asbestos and tongues of asbestos paper punched through the layers of asbestos paper, intertwining the fibers and tongues of different layers together.

References Cited in the file of this patent

UNITED STATES PATENTS

| | | |
|---|---|---|
| 510,026 | Johns | Dec. 5, 1893 |
| 1,134,475 | Macan | Apr. 6, 1915 |
| 1,223,835 | Schmaus | Apr. 24, 1917 |
| 1,726,680 | Rayner | Sept. 3, 1929 |
| 1,984,649 | McDonald et al. | Dec. 18, 1934 |
| 2,023,985 | Williams | Dec. 10, 1935 |
| 2,429,486 | Reinhardt | Oct. 21, 1947 |

FOREIGN PATENTS

| | | |
|---|---|---|
| 467,553 | Great Britain | June 18, 1937 |